United States Patent
Uhl et al.

(10) Patent No.: US 7,706,043 B2
(45) Date of Patent: Apr. 27, 2010

(54) DEVICE FOR CONFOCAL ILLUMINATION OF A SPECIMEN

(75) Inventors: Rainer Uhl, Graefelfing (DE); Christian Seebacher, Graefelfing (DE); Rainer Daum, Machtlfing (DE)

(73) Assignee: Till I.D. GmbH, Graefelfing (DE)

( * ) Notice: Subject to any disclaimer, the term of this patent is extended or adjusted under 35 U.S.C. 154(b) by 0 days.

(21) Appl. No.: 12/506,431

(22) Filed: Jul. 21, 2009

(65) Prior Publication Data

US 2009/0279159 A1 Nov. 12, 2009

Related U.S. Application Data

(62) Division of application No. 12/037,667, filed on Feb. 26, 2008, now Pat. No. 7,580,171.

(30) Foreign Application Priority Data

Feb. 27, 2007 (DE) .................. 10 2007 009 551

(51) Int. Cl.
*G02B 21/00* (2006.01)
*G02B 21/06* (2006.01)

(52) U.S. Cl. ...................... 359/235; 359/368
(58) Field of Classification Search .......... 359/368, 359/234–236
See application file for complete search history.

(56) References Cited

U.S. PATENT DOCUMENTS

| | | | |
|---|---|---|---|
| 4,118,619 A | 10/1978 | McArthur et al. | |
| 5,067,805 A | 11/1991 | Corle et al. | |
| 5,162,941 A | 11/1992 | Favro et al. | |
| 5,579,157 A * | 11/1996 | Tanaami et al. | 359/368 |
| 5,633,751 A | 5/1997 | Tanaami et al. | |
| 5,717,519 A * | 2/1998 | Sugiyama et al. | 359/368 |
| 5,734,497 A | 3/1998 | Yano et al. | |
| 5,760,950 A | 6/1998 | Maly et al. | |
| 5,847,867 A | 12/1998 | Sugiyama et al. | |
| 5,969,846 A | 10/1999 | Kishi | |
| 6,002,509 A | 12/1999 | Wijnaendts Van Resandt et al. | |

(Continued)

FOREIGN PATENT DOCUMENTS

EP 0 539 691 A2 5/1993

(Continued)

*Primary Examiner*—Alessandro Amari
*Assistant Examiner*—Mark Consilvio
(74) *Attorney, Agent, or Firm*—David S. Safran; Roberts Mlotkowski Safran & Cole, P.C.

(57) ABSTRACT

A device for confocal observation of a specimen, having a mask, which is located in the illumination beam path and the image beam path and is rotatable around a central axis, the mask being provided with openings for generating an illumination pattern moving on the specimen, an arrangement of a plurality of focusing microoptics which is adjusted to the geometric arrangement of the openings of the mask and to the rotation of the mask in order to concentrate the illumination light by each of the microoptics into a respective one of the openings of the mask, and a beam splitter for separating light from the specimen from illumination light, wherein the beam splitter is arranged in the beam path between the mask and the arrangement of the microoptics, and wherein an optical arrangement is provided in the beam path between the mask and the arrangement of the microoptics.

11 Claims, 12 Drawing Sheets

U.S. PATENT DOCUMENTS

| | | |
|---|---|---|
| 6,147,798 A | 11/2000 | Brooker et al. |
| 6,934,079 B2 | 8/2005 | Hell et al. |
| 7,280,680 B2 | 10/2007 | Yokota et al. |
| 2003/0011881 A1 * | 1/2003 | Sure .......................... 359/388 |
| 2006/0052709 A1 | 3/2006 | DeBaryshe et al. |
| 2007/0035734 A1 | 2/2007 | Müller et al. |

FOREIGN PATENT DOCUMENTS

| | | |
|---|---|---|
| EP | 0 753 779 B1 | 1/1997 |
| EP | 1 168 029 A2 | 1/2002 |
| EP | 1 245 986 A2 | 10/2002 |
| JP | 8-110473 A | 4/1996 |
| JP | 09133870 A * | 5/1997 |
| JP | 2004-288279 A | 10/2004 |
| WO | 91/13379 A1 | 9/1991 |

* cited by examiner

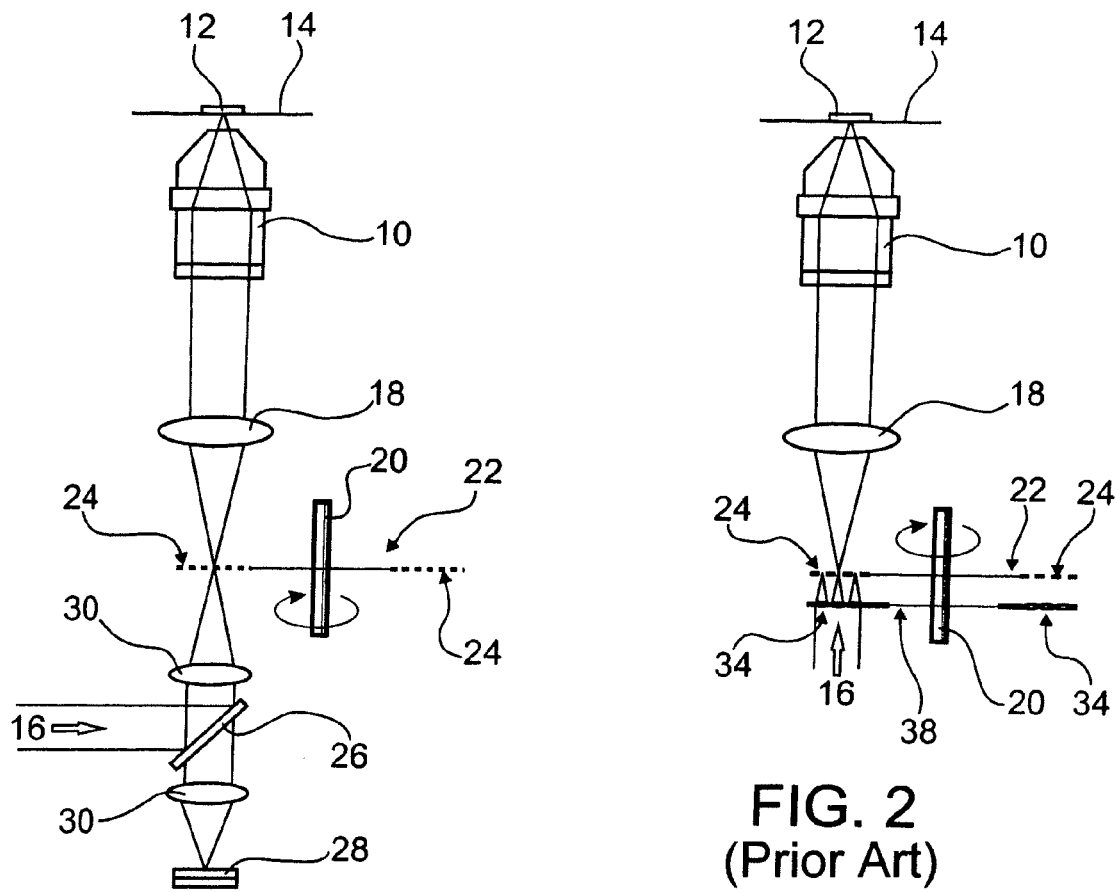
FIG. 1 (Prior Art)
FIG. 2 (Prior Art)
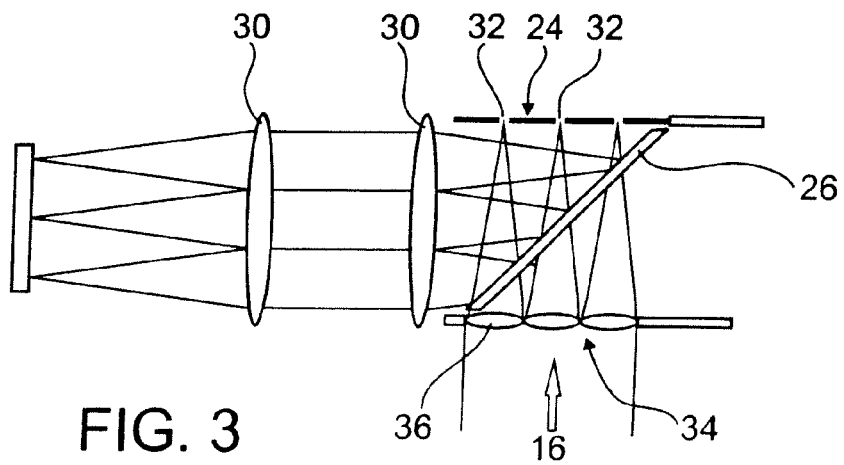
FIG. 3 (Prior Art)

DEVICE FOR CONFOCAL ILLUMINATION OF A SPECIMEN

CROSS REFERENCE TO RELATED APPLICATION

This application is a divisional of commonly owned, co-pending U.S. patent application Ser. No. 12/037,667, filed Feb. 26, 2008.

BACKGROUND OF THE INVENTION

1. Field of the Invention

The invention relates to an apparatus for confocal observation of a specimen comprising a rotating mask.

2. Description of Related Art

More than 100 years ago the German inventor Paul Nipkow described an imaging method including a plurality of illumination points located on a pinhole mask in such a manner that upon rotation of the pinhole mask around the central rotary axis all points which are to be illuminated are illuminated sequentially—for the same period of time if possible. Such a pinhole mask also is known as "Nipkow disc". This method enables so-called confocal microscope images by passing the illumination beam path and the image beam path in reverse beam direction through the same pinhole mask, whereby light from outside the object plane can be blocked and whereby good depth resolution can be obtained.

Such a confocal microscope according to the prior art is shown schematically in FIG. 1. The microscope comprises an objective 10 which is for illuminating a specimen 12 in the object plane 14 with illumination light 16 and which collects light reflected from the specimen 12 or emitted from the specimen 12 and images the light—usually by means of a tube lens 18—into the plane of an intermediate image, where a pinhole mask (Nipkow disc) 22 rotating round an axis 20 which is oriented parallel to the beam path is arranged, onto which pinhole disc an appropriate pinhole pattern 24 has been provided which is arranged concentrically around the rotary axis 20. The separation and combination, respectively, of the illumination beam path and the image beam path by using a beam splitter 26 occurs after (when seen from the objective 10) the Nipkow disc/pinhole mask 22, with the light emitted or reflected from the specimen 12 impinging on a detector 28, i.e. being imaged onto the detector 28. Such an arrangement is particularly beneficial for fluorescence microscopy, since in that case illumination/excitation and emission occur at different wavelengths, so that the illumination light and the emission light can be separated from each other essentially without losses, if the beam splitter 26 is dichroic. In the example shown in FIG. 1 the beam splitter 26 transmits the emission light, whereas the illumination light 16 is reflected. With such an arrangement the pinhole mask 22 on the one hand is imaged by the tube lens 18 and the objective 12 into the objective plane 14 and hence onto the specimen 12, while on the other hand the pinhole mask 22 is imaged onto the detector 28, typically by means of two projective lenses 30, by imaging the intermediate image first into infinity and then onto the detector 28. As can be seen in FIG. 1, always only a portion of the area of the Nipkow disc/pinhole mask 22 is illuminated each time.

The desired confocal effect is achieved in that only a small portion of the specimen 12 in the object plane 14 is illuminated at the same time by the illumination light 16, namely only there where a pinhole of the pinhole mask 22 is imaged onto the specimen 12, and in that these illumination points are spaced sufficiently far apart, so that the illumination light 16 passing through the respective pinhole in the pinhole mask 22 is not tampered or tampered only to a small extent by reflected light or emitted light from the specimen 12 caused by an adjacent pinhole of the pinhole mask 22. The pinholes of the pinhole mask 22 hence act as confocal apertures. In a system as shown in FIG. 1 usually only that portion of the excitation light 16 is utilized which passes through the pinholes of the pinhole mask 22, whereas the remaining portion of the illumination light is blocked, so that such systems have a relatively low efficiency and hence have relatively low light transmitting power. An example of such a system can be found in U.S. Pat. No. 6,147,798.

A system and a method allowing for an increased light throughput for a confocal microscope comprising a Nipkow disc is described, for example, in EP 0 539 691 A2. The optical arrangement described there is schematically shown in FIGS. 2 and 3. A microlens arrangement 34 is provided which is axially displaced with regard to the pinhole mask 22 and which has a geometry which is adjusted to the pinhole pattern 24 and which rotates synchronously with the pinhole mask 22 around the same rotary axis 20. Each microlens 36 of the microlens arrangement 34 is located on a disc 38 and serves to concentrate the portion of the illumination light 16 falling onto the respective microlens 36 into the associated pinhole 32 of the pinhole mask 22, i.e. to focus the light onto a focal spot which is located within the respective pinhole 32. Hence, for each pinhole 32 of the pinhole mask 22 there is a conjugate microlens 36 of the microlens arrangement 34. Since the pinhole mask 22 is located in the focal plane of the microlenses 36, the light throughput can be significantly increased thereby, at least if the illumination light beam 16 is a coherent laser light beam. However, one problem of this approach is that beam splitting occurs in the converging beam path between the two discs 22 and 38, where due to the short focal length of the microlenses 36 there is little space for the beam splitter 26, which in this case has to be a short pass filter. In order to avoid image distortions caused by inaccuracies of the surface, the beam splitter 26 must not be too thin. A corresponding thickness of the beam splitter 26, however, creates beam displacement increasing with increasing inclination of the beam splitter 26, which displacement points linearly into the direction of the inclination. For two synchronously rotating discs 22 and 38 having a radially arranged pattern this beam displacement causes that the focal spot of the microlenses 36 does not always coincide with the corresponding pinhole 32 of the pinhole mask 22. This effect has to be compensated by tilting one of the discs relative to the other one.

For a Nipkow disc the pinholes usually are arranged in several spiral tracks or shells which mesh with each other. Since a confocal microscope requires the observation field to be illuminated as homogeneously as possible, all points of the filed have to be illuminated exactly for the same period of time, provided that the pinholes have the same size everywhere and that the illumination is homogeneous. This holds also for the microlenses used. According to EP 0 539 691 A2 homogeneous illumination of the specimen is achieved by keeping constant the tangential distance between adjacent pinholes and by keeping also the radial distance between adjacent shells of the pinholes constant at the same value irrespective of the radius r. Thus, the radial distance between adjacent pinholes varies between the value 1×r and the value 1.12×r, and the filling factor is reduced to a maximum of 78.5% if using circular microlenses are used. Further examples of pinhole patterns for Nipkow discs for microscopes are given in U.S. Pat. No. 5,734,497 and U.S. Pat. No. 5,067,805.

Other confocal microscopes comprising a beam splitter between a Nipkow disc and a microlens arrangement which is axially displaced and which rotates synchronously with the Nipkow disc are described, for example, in US 2007/035734 A1, EP 1 168 029 A2 and US 2003/0215121 A1.

A modified confocal microscope is described in EP 0 753 779 B1, wherein in the region between the microlens disc and the Nipkow disc mirrors are provided in order to pass the light radially out of the space between the two discs for image formation and beam splitting.

In US 2005/094261 A1 a confocal microscope is described, wherein in front of (when seen from the objective) a microlens disc rotating synchronously with the Nipkow disc a second microlens disc is provided, which is axially displaced with regard to the first microlens disc, which likewise rotates synchronously with the Nipkow disc and which is exactly adjusted to the first microlens disc, so as to create an infinity space, i.e. parallel beam paths, between the two microlens discs, in which space the beam splitter is arranged. For this device the mechanical requirements resulting from the demand that the two microlens discs have to be always exactly adjusted to each other are critical.

U.S. Pat. No. 5,760,950 describes a confocal microscope which does not use microlenses and wherein a radial region which is covered by a rotating Nipkow disc, is illuminated with light from a light source, wherein the illumination light having passed through this first region is deflected by 90 degrees by means of a penta prism, and wherein the deflected light is again deflected by 90 degrees by means of a beam splitter and is used for illuminating a second radial region which is covered by the rotating Nipkow disc, which second radial region is located exactly opposite to the rotary axis, i.e. displaced by 180 degrees in the peripheral direction. The second region of the Nipkow disc is imaged onto the specimen by means of the objective, and the light originating from the specimen is spatially filtered by this second region of the Nipkow disc prior to being imaged onto the detector.

It is an object of the invention to provide for a confocal device for observation of a specimen comprising a rotating mask provided with openings, which device should have a light gathering power as high as possible and which nevertheless should have a relatively simple structure.

SUMMARY OF THE INVENTION

According to the invention, this object is achieved by confocal devices as defined in the claims.

The solution is beneficial in that, by providing in the beam path between the mask provided with openings and the microoptics an optical arrangement for generating an infinity space in which the beam splitter is arranged, on the one hand due to the microoptics a high concentration of the illumination light on the openings of the mask—and hence a high light gathering power—can be achieved, while on the other hand due to the arrangement of the beam splitter in the infinity space beam displacement at the beam splitter can be avoided in a structurally simple manner. In particular, neither an additional microlens arrangement as described in US2005/094261 A1 nor structural correction measures with regard to beam displacement at the beam splitter as described in EP 0 539 691 A2 are required.

Preferably the infinity space is generated by two projective lenses of the optical arrangement, between which the beam splitter is arranged (rather than using two projective lenses, also other focussing optical elements such as normal lenses, holographic elements or mirrors could be used). In this regard it has to be taken into account that intermediate imaging, such as by means of two projective lenses, generates a mirror-inverted image of the rotating focal pattern generated by the microoptics, which image accordingly rotates in a direction opposite to that of the focal pattern and the pattern of the microoptics, respectively. This issue can be addressed, for example, (1) by providing for subsequent second imaging which cancels the specular reflection, for example, by two further projective lenses, (2) by providing for an image-inverting roof prism which provides for the necessary beam rotation, or (3) by choosing the arrangement of the pattern of the microoptics and the opening pattern relative to each other in such a manner that cancelling of the mirror-inverted imaging caused by the two projective lenses can be omitted. The latter can be achieved by providing separate rotation axes for the pattern for the microoptics and the opening pattern, wherein the two rotation axes in one case are oriented parallel to each other and the two pattern are axially displaced with regard to each other and partially overlap, or wherein in another case the two rotation axes are oriented at an angle relative to each other, preferably perpendicular. According to a preferred embodiment the openings of the mask and the microoptics arrangement are oriented concentrically around a common central rotation axis, with the openings of the mask and the microoptics arrangement, however, being displaced radially relative to each other. Such arrangement is beneficial in that the microoptics arrangement and the mask can be arranged on a common disc, so that synchronization between separate discs is not necessary.

Preferably, the microoptics are microlenses.

The solution is beneficial in that, by arranging the openings of the mask and the microoptics arrangement in a fixed manner relative to each other and concentric around the central axis, however, with radial displacement relative to each other being provided for, a simple and stable mechanical arrangement of the mask and the microoptics arrangement, in particular on a single disc, is enabled, and in addition a particularly good accessibility of the mask and the microoptics arrangement for placing optical elements, such as the beams splitter, is achieved at minimum limitation of available space.

The solution is beneficial in that, by forming the microoptics as focusing micromirrors which each comprises one of the openings of the mask, with a focusing macrooptics being provided for imaging the focal pattern of the illumination light generated by the micromirrors onto the openings of the mask, a simple, stable and maximally compact—namely integrated—mechanical arrangement of the mask and the microoptics arrangement is enabled, whereby also in this case a particularly good accessibility of the mask and the microoptics arrangement for placing optical elements, such as the beam splitter, is achieved at minimum limitation of available space.

The opening pattern provides for the benefit that it allows for a higher packing density of the microoptics compared to an arrangement as it is described, for example, in EP 0 539 691 A2, so that an increased light gathering power can be achieved.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 1 is a schematic view of a confocal device comprising a Nipkow disc according to the prior art;

FIG. 2 is a schematic view of a part of a confocal device according to the prior art comprising a microlens array;

FIG. 3 shows a detail of FIG. 2;

DETAILED DESCRIPTION OF THE INVENTION

In general, with regard to the representation of the beam paths in the Figures it is to be taken into account that for the sake of illustration usually the focal lengths of the microoptics (microlenses/micromirrors) are represented much too large compared to the focal lengths of the macrooptics (in practice, for example, a typical ratio would be 1:30 (for example, 3 mm vs. 90 mm)).

Figure 4:
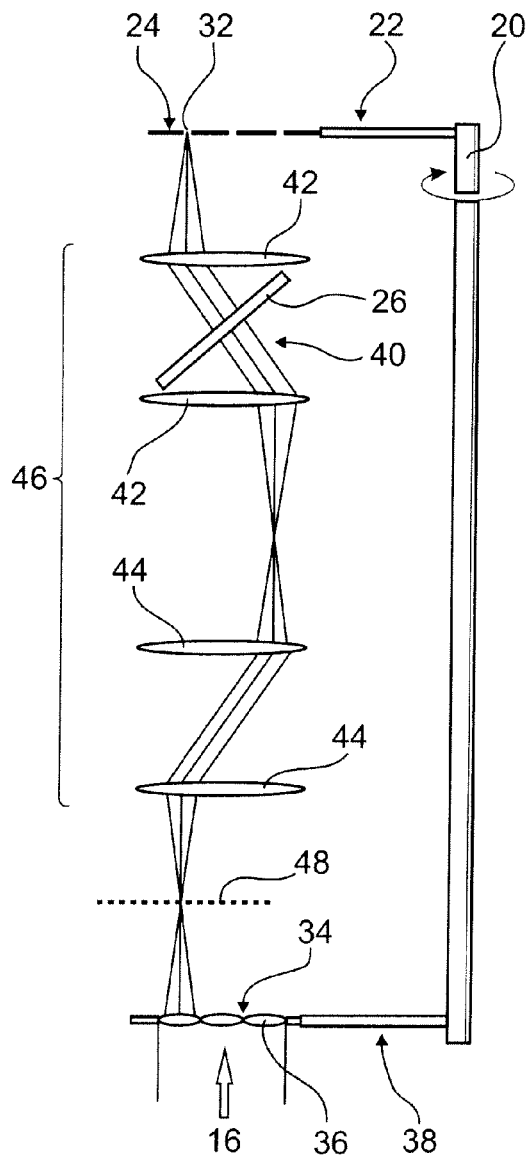
FIG. 4 is a schematic view of a part of a first embodiment of a confocal device according to the invention.

In FIG. 4 a first example is schematically shown of how, according to the invention, an infinity space can be created between the opening pattern 24 of the mask 22 and the microlens arrangement 34, in which infinity space the beam splitter 26 for separating the illumination light and light reflected and/or emitted by the specimen can be located.

According to this example, an infinity space 40 is generated by means of two projective lenses 42 between which the beam splitter 26 is located which transmits the illumination light 16 and which essentially reflects the emission light of the sample 12 (the detector for the emission light is not shown in FIG. 4). The pinhole mask 22 and the microlens arrangement 34 both are arranged concentric with regard to a common rotation axis 20 which extends parallel to the beam path and which serves as a common rotation axis for the microlens arrangement 34 and the opening pattern 24, i.e. for the respective discs 22 and 28. The mask 22 comprising the opening pattern 24 hence is fixed relative to the microlens arrangement 34 but is axially displaced with regard to the microlens arrangement 34, with no radial displacement being present. The opening pattern 24 and the microlens arrangement 34 are arranged in a congruent and right-reading manner relative to each other and rotate synchronously around the common rotation axis 20.

According to the example of FIG. 4, the specular reflection, i.e. the mirror-inverting imaging, caused by the two projective lenses 42 is inverted, i.e. cancelled, by a further pair of projective lenses 44, which are located between the projective lenses 42 and the microlens arrangement 34. Thereby the imaging caused by the optical arrangement 46 consisting of the two projective lens pairs 42 and 44 is not mirror-inverted; in particular, the image of the focal spots of the microlenses 36 rotates in the same direction as the opening pattern 24. The optical arrangement 46 serves to image the focal plane 48 of the microlens arrangement 34, i.e. the focal spot of each microlens 36, onto the opening pattern 24 in such a manner that the image of a focal spot falls exactly within one of the openings 32 in order to concentrate the illumination light 16 within the openings 32, as far as it is allowed for by the geometric arrangement of the microlenses 34. If the microlens arrangement 36 and the opening pattern 24 are congruent, the optical arrangement 46 provides for a scale ratio of 1:1.

It is to be understood that according to all embodiments for each point in time always only a portion of the mask and a portion of the microoptics is illuminated and imaged, respectively. Since the respective macrooptics are fixed in space and the mask and the microoptics arrangement, respectively, rotate relative to the macrooptics, the instantaneously illuminated or imaged portion revolves in the coordinate system of the mask and the microoptics arrangement, respectively.

In the following, "portion of the mask" and "portion of the microoptics arrangement", respectively, is intended to designate this portion which revolves in the coordinate system of the mask and the microoptics arrangement, respectively.

Figure 5:
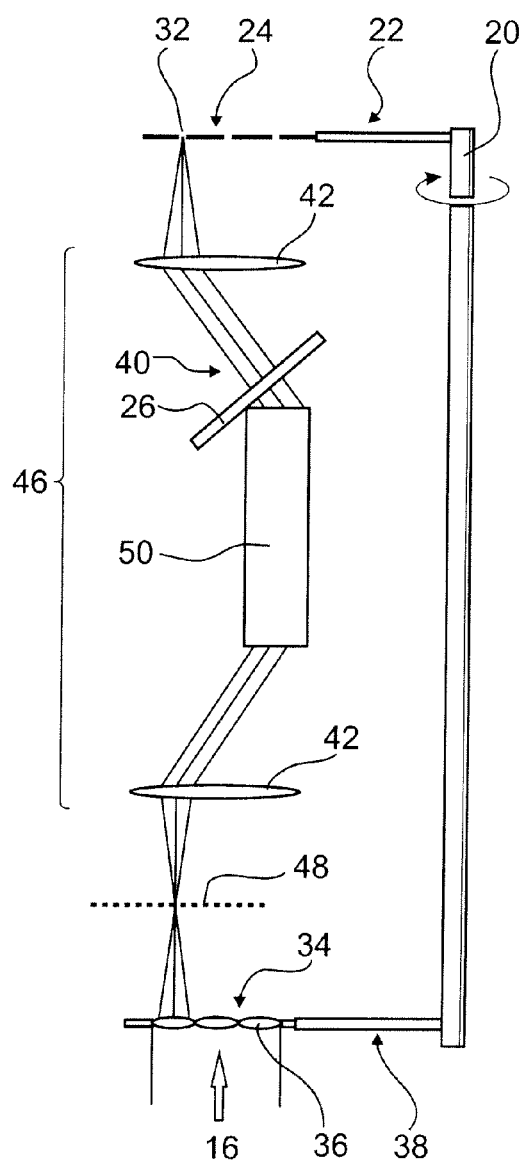
FIG. 5 is a view like FIG. 4, with a second embodiment of the invention being shown

In FIG. 5 an alternative embodiment of the optical arrangement 46 is shown, wherein an image-inverting unit 50 is provided between the two projective lenses 42, which unit may be an appropriate roof-prism, for example, an Abbe-Koenig-prism or a Schmidt-Pechan-prism. Thereby the optical arrangement 46 formed by the projective lenses 42 and the image-inverting unit 50 provides for an 1:1 imaging without specular reflection, so that the second projective lens pair 44 of FIG. 4 can be omitted (in the embodiment of FIG. 4 the image-inverting unit is formed by the projective lenses 44). In general, the image-inverting unit of the optical arrangement 46 may be provided in before, after or in between the projective lenses 42.

It is to be understood that the optical arrangement 46, at a certain point in time, images only a portion of the focal plane 48 and a portion of the microlenses 36, respectively, onto the opening pattern 24 and that the optical arrangement 46 is fixed in space, i.e. the discs 22 and 38 rotate with regard to the optical arrangement 46 around the axis 20.

Figure 6A:
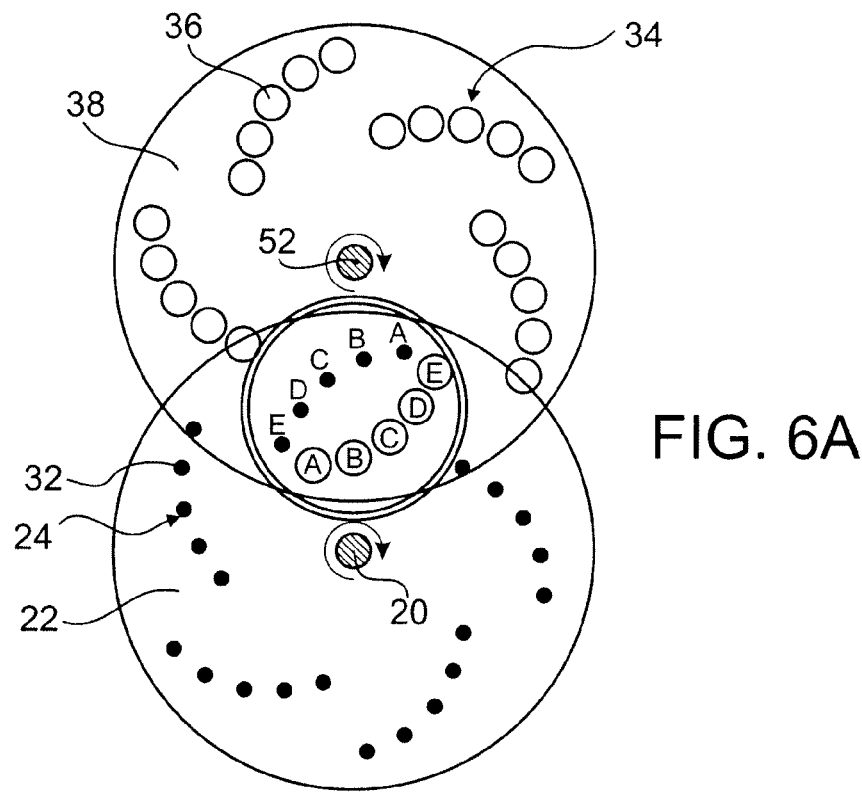
FIGS. 6A and 6B are an elevated view and a side view, respectively, of a third embodiment of the invention.
Figure 6B:
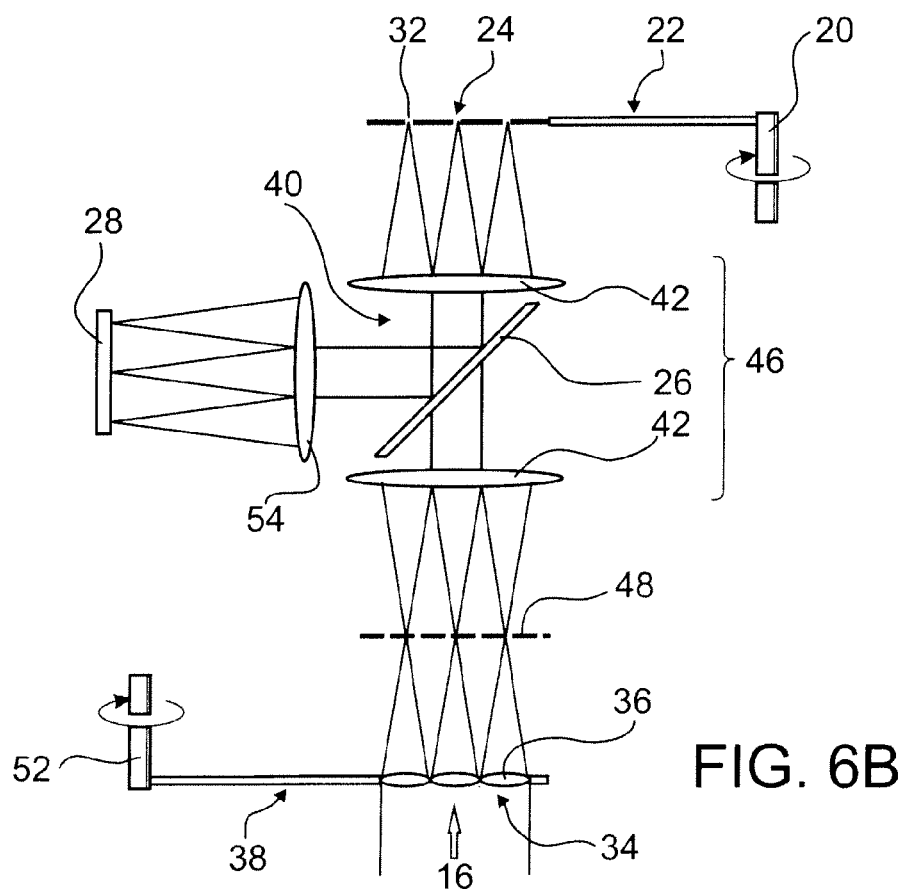
Figure 7:
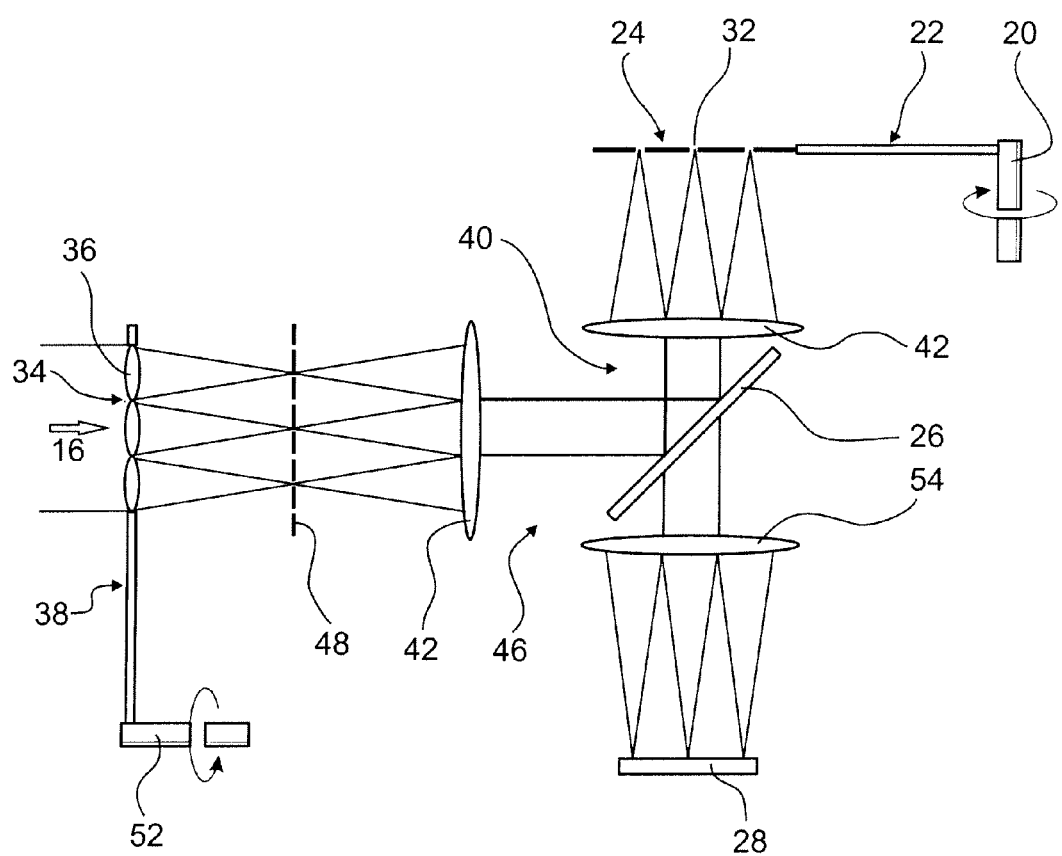
FIG. 7 is a side view of a fourth embodiment of the invention.

In FIGS. 6A, 6B and 7 two other approaches are shown of how the image inversion caused by the projective lenses 42 can be compensated, without using an additional image-inverting unit, by arranging the openings pattern 24 and the microlens arrangement 34 in an appropriate manner relative to each other and by moving the opening pattern 24 and the microlens arrangement 34 relative to each other in an appropriate manner.

According to the embodiment of FIGS. 6A and 6B the microlens arrangement 36 is not rotated around a common axis 20 but rather around a separate axis 52 extending parallel to the axis 20 around which the openings pattern 24 is rotated. Accordingly, the opening pattern 24 is arranged concentric with regard to the axis 20, whereas the microlens arrangement 34 is arranged concentric with regard to the axis 52. The two rotation axes 20 and 52 are radially displaced with regard to each other in such a manner that the mask 22 and the microlens disc 38 overlap in the region between the two rotation axes 20 and 52, with the two discs 22 and 38 being axially displaced with regard to each other, so that the projective lenses 42, between which the beam splitter 26 is arranged, can be arranged in-between. According to the embodiment of FIGS. 6A, 6B the optical arrangement 46 hence is formed by the two projective lenses 42, which optical arrangement 46 images the focal plane 48 of the microlens arrangement 36 onto the opening pattern 24 in a mirror-inverted manner.

As can be seen in FIG. 6A, the two discs 38 and 22 rotate in the same direction (in the example in a clock-wise manner), and the microlens arrangement 34 and the opening pattern 24 are arranged relative to each other in a congruent and right-reading manner. The shown arrangement of these elements has the effect that in the overlapping area of the two discs 38 and 22 the illuminated portion of the microlens arrangement 34 and that portion of the opening pattern 24 onto which the focal plane 48 of the illuminated portion of the microlens arrangement 34 and the light originating from the sample are imaged move in opposite directions relative to each other and are located in a mirror-inverted manner relative to each other. Thereby the focal spots of the microlenses 36 designated in FIG. 6A by A to E are imaged in a mirror-inverted manner—and hence in an appropriate manner—onto the respective openings A to E of the opening pattern 24. Also the direction of movement of the focal spots of the microlenses A to E is reversed by the mirror-inverted imaging by the optical arrangement 46 and then is parallel to that of the openings A to E.

Like in the embodiments of FIGS. 4 and 5, respectively, the beam splitter 26 is transparent for the illumination light 16, but it reflects the emission light of the specimen 12. It is indicated in FIG. 6B how, by means of an optical system 54, emission light originating from the sample 12 and collected by the objective 10, which emission light has passed through the openings 32, is imaged from the infinity space between the two projective lenses 42 onto the detector 28. Such an arrangement is also suitable for the embodiments according to FIGS. 4 and 5, respectively.

FIG. 7 shows an embodiment, wherein the rotation axis 20 of the mask 22 and the rotation axis 52 of the microlens disc 38 are arranged at an angle relative to each other, which angle is 90 degrees in the shown example. In this case, like in the embodiment of FIGS. 6A, 6B, the focal plane 48 of the microlens arrangement 34 is imaged, by means of the projective lenses 42, onto the opening pattern 24 in a mirror-inverted manner. Accordingly, the illuminated portion of the microlens arrangement 34 and the opening pattern 24 are arranged in a mirror-inverted manner and move in opposite directions relative to each other. In contrast to the embodiment of FIGS. 6A, 6B the beam splitter 26 preferably is designed such that it reflects the illumination light 16 and that it is transparent for the emission light of the specimen 12, which light is imaged onto the detector 28 by means of the optical system 54.

Figure 8:
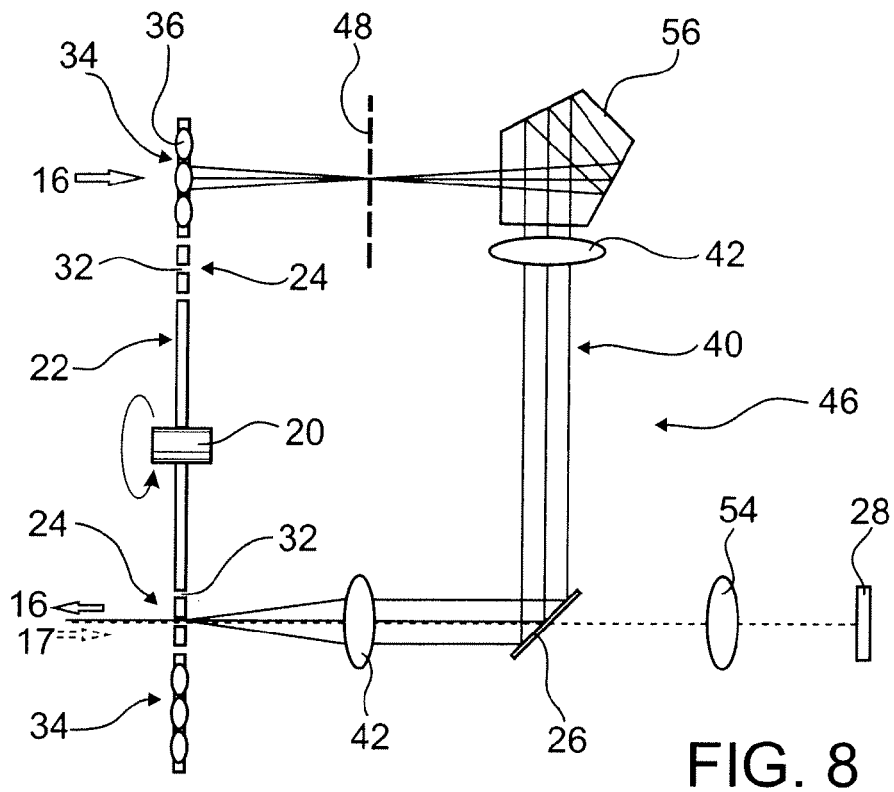
FIG. 8 is a side view of a fifth embodiment of the invention.

FIG. 8 shows an embodiment of the invention, wherein the opening pattern 24 and the microlens arrangement 34 are arranged on a common disc 22 radially displaced with regard to each other and concentric with regard to the common rotation axis 20. According to the example of FIG. 8, the microlens arrangement 34 is shown as being located radially outwardly and the opening pattern 24 is shown as being located radially inwardly. The portion of the microlens arrangement 34 illuminated by the illumination light 16, i.e. more precisely the focal spots of the illuminated microlenses 36 in the focal plane 48, is imaged, by means of the two projective lenses 42, onto a portion of the opening pattern 24, which portion is displaced in the peripheral direction with regard to the illuminated portion of the microlenses 36 and onto which portion the light originating from the specimen and collected by the objective 10 is imaged.

According to the example shown, these two portions are displaced in the peripheral direction by 180 degrees, i.e. they are arranged opposite to each other with regard to the rotation axis 20. The scale ratio corresponds to the ratio of the radius of the microlens arrangement 34 and the radius of the opening pattern 24, and it can be adjusted accordingly by the ratio of the focal length of the two projective lenses 42. In contrast to the embodiments described so far, the opening pattern 24 and the microlens arrangement 34, due to the radial displacement, are not congruent in the present case.

It would be the most simple measure to deflect the illumination light beam only twice when imaging the focal plane 48 onto the opening pattern 24. However, in this respect, it has to be taken into account that then the image of the focal plane 48 on the opening pattern 24 would be mirror-inverted, and hence it would move into the opposite, i.e. the wrong, direction. This can be prevented by taking care that the illumination beam path between the microlenses 36 and the openings 32 of the opening pattern 24 contains an odd number of reflections. This can be achieved, for example, as shown in FIG. 8, by providing for the first deflection of the illumination light 16 a penta prism 56 even before the first projective lens 42, which prism 56 provides for a 90 degrees deflection irrespective of the angle of incident, whereby, in contrast to a 90 degrees deflection, for example, by means of a mirror, no mirror-inverting takes place. The second deflection then may occur, for example, by means of the beam splitter 26 which in this case reflects the illumination light 16 and which is transparent for the emission light 17 from the specimen 12, which light is collected from the specimen 12 by the microscope objective 10 and which is imaged by means of the tube lens 18 onto that portion of the openings 32 which is illuminated with the illumination light 16. The emission light 17 penetrates through the openings 32 acting as a confocal aperture, and it is imaged onto the detector 28 by means of the projective lens 42 and the optical system 54. The beam splitter 26 is located in the infinity space created by the projective lenses 42, whereby separation of the illumination light 16 and the emission light 17 is facilitated.

Figure 9:
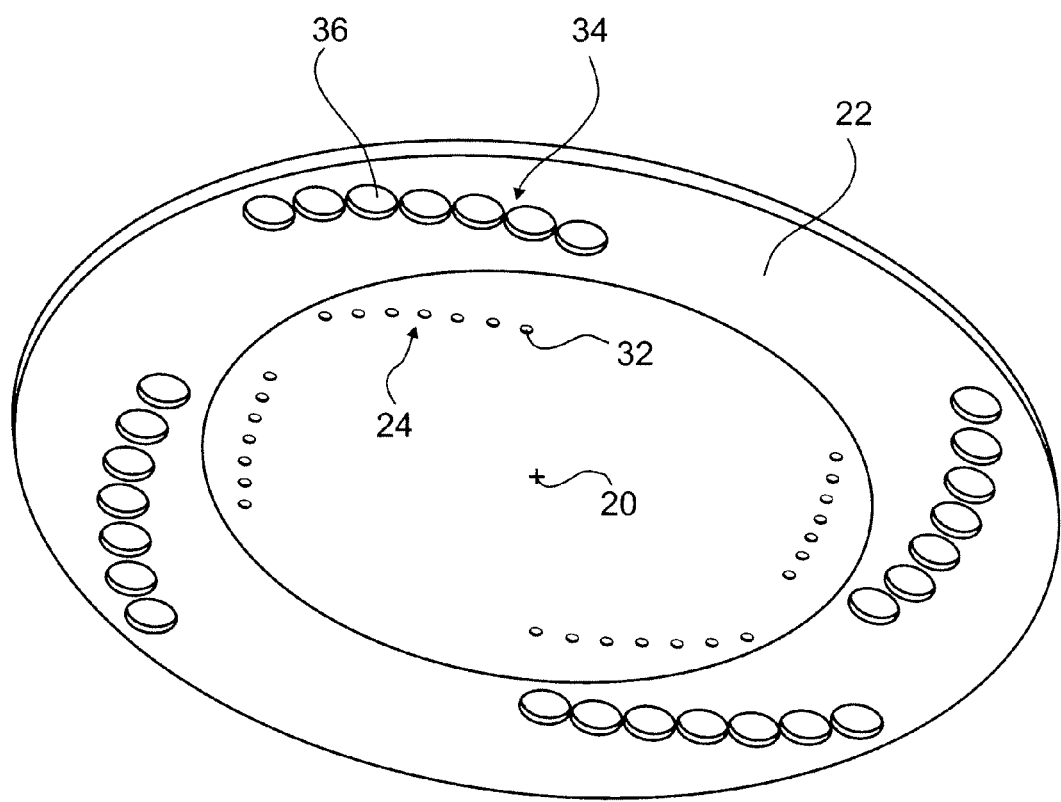
FIG. 9 is an elevated view of the disc of the embodiment of FIG. 8 shown in a schematic representation.

An elevated view of the disc 22 comprising the opening pattern 24 and the microlens arrangement 34 is shown schematically in FIG. 9.

Arrangements designed in the manner shown in FIGS. 8 and 9, wherein the microlens arrangement 34 and the opening pattern 24 can be arranged on a common disc, are beneficial in that the need for sophisticated synchronization of two separate discs and for a (relatively large and hence destabilizing) axial displacement of two discs, which are fixed relative to each other and which rotate around a common axis, in order to house the imaging optics is avoided.

A further benefit is that due to the long and well-accessible illumination beam path between the openings 32 of the mask and the microlenses 34 even the above-described generation of the infinity space 40 by means of the projective lenses 42 can be omitted. If the beam splitter 26, as shown in FIG. 8, is designed as a long pass, i.e. as a deflection element for the illumination light, the beam displacement caused by the beam splitter 26 need not be compensated by tilting the disc 22—even if the beam splitter is located in the finite space.

Figure 10:
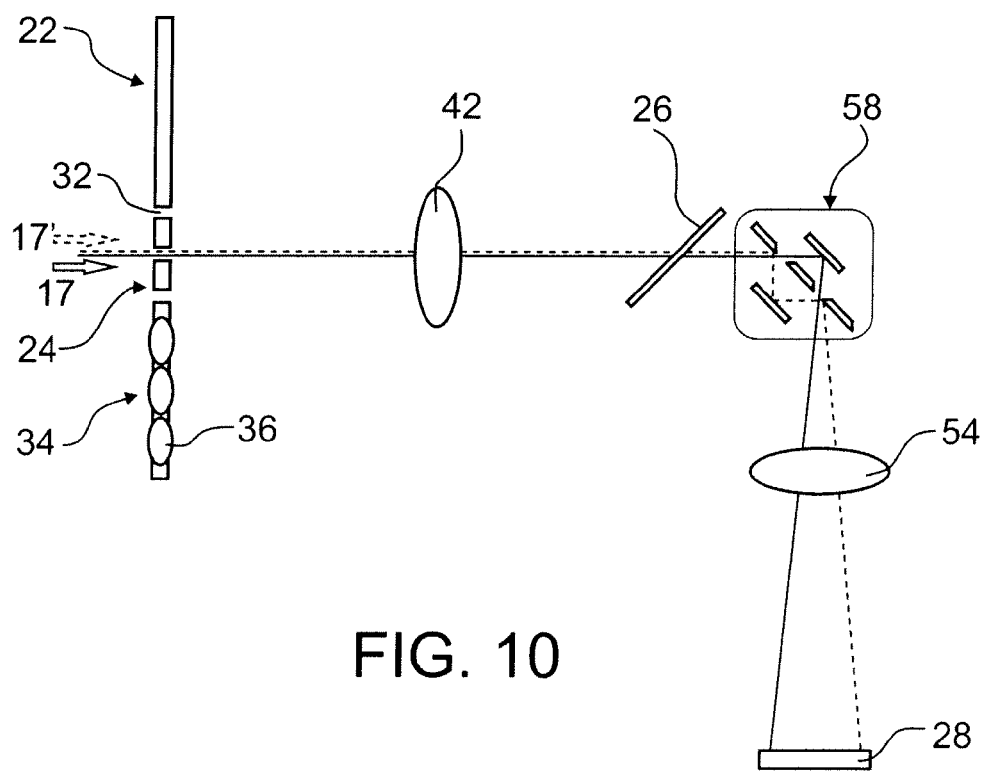
FIG. 10 shows a modification of the embodiment of FIG. 8.

FIG. 10 shows an example of how, when using the arrangements of FIGS. 8 and 9, splitting of the emission image into several partial images on the detector 28 can be achieved without the need to increase the number of optical imaging elements, with the partial images having different colours and being separated in space from each other. In the schematic representation of FIG. 10 the illumination beam path has been omitted for the sake of simplicity. An optical element 58 is provided in the infinity space, i.e. between the two projective lenses 42, which element 58 deflects light 17 of a longer wavelength at a different angle than light 17' at a shorter wavelength. Such elements 58 are known and available, for example, under the designation "W-view". According to the example of FIG. 10 the optical element 58 is arranged in the infinity space behind (as seen from the disc 22) the beam splitter 26. The arrangement shown in FIG. 10 in general also works, for example, with an arrangement according to FIGS. 12A and 13, respectively.

When using micromirrors rather than microlenses it is possible to combine in a Nipkow arrangement the image beam path and the illumination beam path in such a manner that, as in the example of FIGS. 8 and 9, no axial displacement between the microoptics and the mask is required and—in contrast to the example of FIGS. 8 and 9—for both elements even the same radial region of the rotating Nipkow disc may be utilized, i.e. there are no longer any scale ratio requirements which are to be critically obeyed. Two different embodiments of this principle are shown in FIGS. 12A and 13, respectively.

Figure 12A:
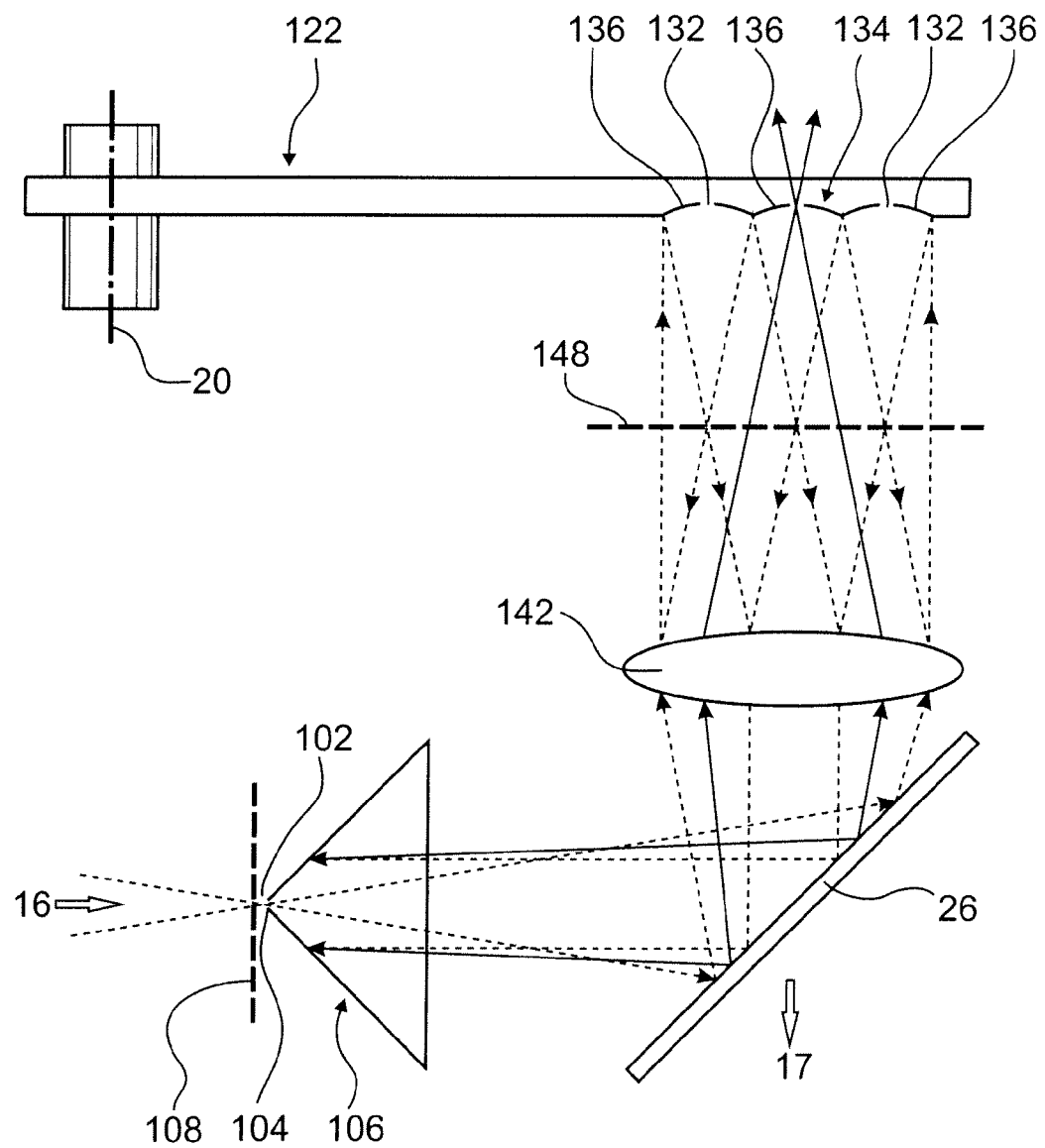
FIG. 12A is a side view of a further embodiment of the invention.

According to the embodiment of FIG. 12A the illumination light 16, which is concentrated by an optical system (not shown) onto a point 102 is coupled into the arrangement by the flattened tip 104 of a retroreflector prism ("corner tube") 106. The divergent light originating from the entrance point 102 is deflected by a beamsplitter 26 (here a long pass filter) and is collimated by a lens arrangement, for example a projective lens 142, in such a manner that it illuminates a field on the Nipkow disc 122 rotating around an axis parallel to the beam direction, the size of which field corresponds to the image field seen by the detector (not shown). An arrangement 134 of focussing micromirrors 136 is located on that radial area of the disc 12 which is swept by the illuminated field during rotation, with the centre of each of the micromirrors comprising a opening 132 for transmitting light. A small portion of the light impinging onto each of the micromirrors 136 (corresponding to the ratio of the area of the opening to the total area of the respective hollow mirror) passes the mirror through this opening 132 already when impinging for the first time, and from there it passes via the microscope beam path to the specimen (not shown). The larger portion of the light, however, is reflected back through the concave micromirrors 136, whereby in the focal plane 148 of the concave micromirrors 136 a focal pattern is created which rotates together with the disc 122. Since the focal pattern rests in or close to the (front) focal plane of the projective lens 142, it is imaged into infinity by the projective lens 142 which is passed in the rearward direction, and, after having been reflected again by the beam splitter 26, it passes to the prism 106, where it is reflected again. The non-reflecting, flattened tip 104 corresponds to the image of the central opening 132 of each of the concave micromirrors 136.

If the prism 106, i.e. the flattened tip 104 thereof, were exactly located in the (back) focal plane 108 of the projective lens 142, the beam, which is sent back on the same path via the beam splitter 26 and the projective lens 142 again onto an micromirror 136, would be collimated again at that place and would be reflected back once more. However, if the prism 106, i.e. the tip thereof, is moved in an appropriate manner a little bit out of the focal plane 108 of the projective lens 142, the telecentric focal spots each fall onto the transparent openings 132 in the center of the concave micromirrors 136, the light is transmitted there and is deflected onto the specimen as a rotating spot pattern via the microscope beam path. The light sent back from the specimen (by reflection or fluorescence) is filtered in space by the openings 132, is imaged into infinity by the projective lens 142, is transmitted by the beam splitter 26 and then is imaged onto the detector by another optical arrangement (not shown).

Figure 13:
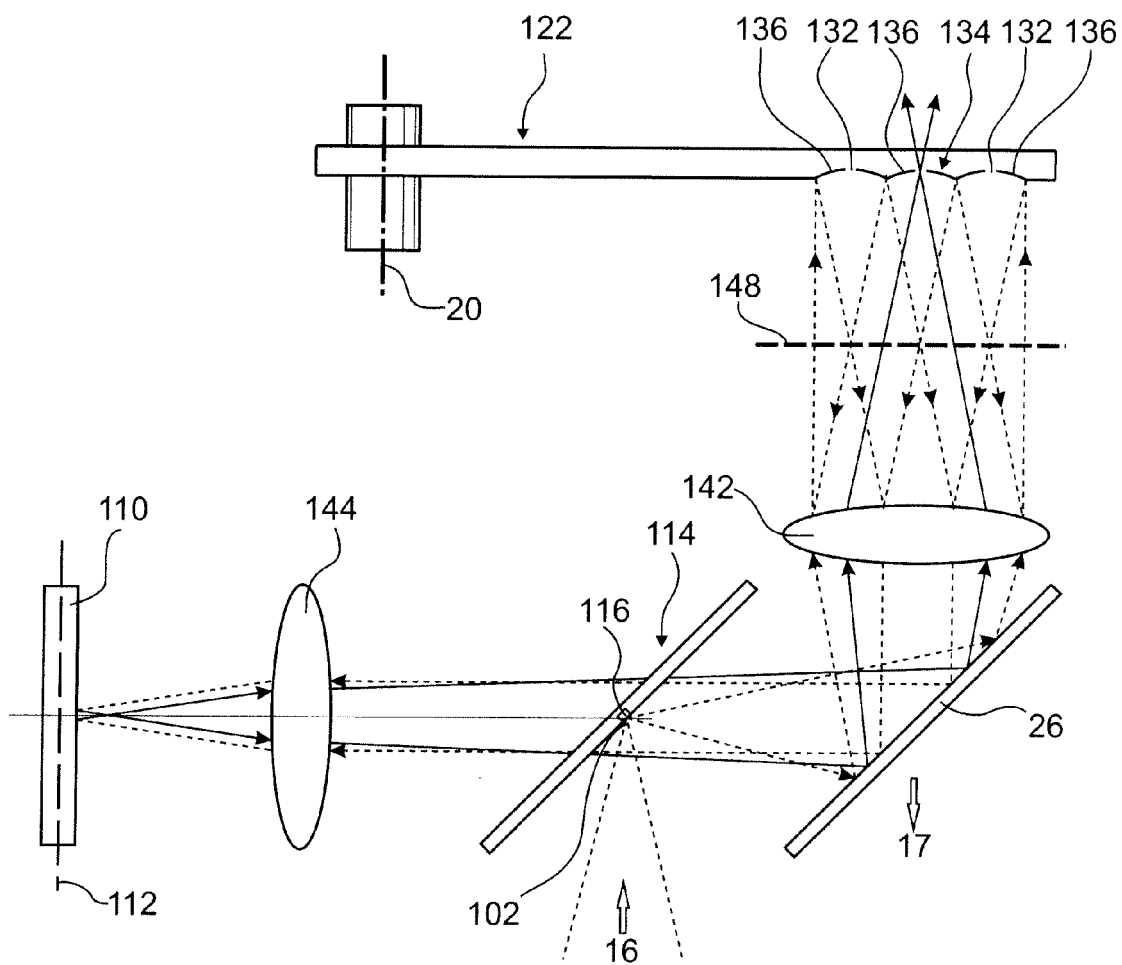
FIG. 13 is a side view of a modification of the embodiment of FIG. 12.

According to FIG. 13 the task of the prism 106 also can be fulfilled by a mirror which then, however, could not be placed in the focal plane of the projective lens 142 (this would mean that the micromirrors 136 and their image would rotate relative to each other in a point-reflected manner); rather it could be placed only after a further projective lens 144 which creates an image of the rotating focal spot pattern of the micromirrors 136 in or close to the plane of a plane mirror 110. Also in this case, the mirror 110 has to be moved slightly out of the focal plane 112 of the optical arrangement, i.e. here the projective lens 144, so that the image of the focal spot pattern of the micromirrors comes to rest within the openings 132. Moreover, a location analogue to the flattened tip 104 of the prism 106 has to be created, via which location the illumination beam which has only the size of a spot can be coupled. Optimally, this is achieved by means of a tilted beam splitter plate 114 which is transparent and which comprises only in the beam center a small mirror-coated area 116 which is located in the (back) focal plane of the projective lens 142.

Figure 14:
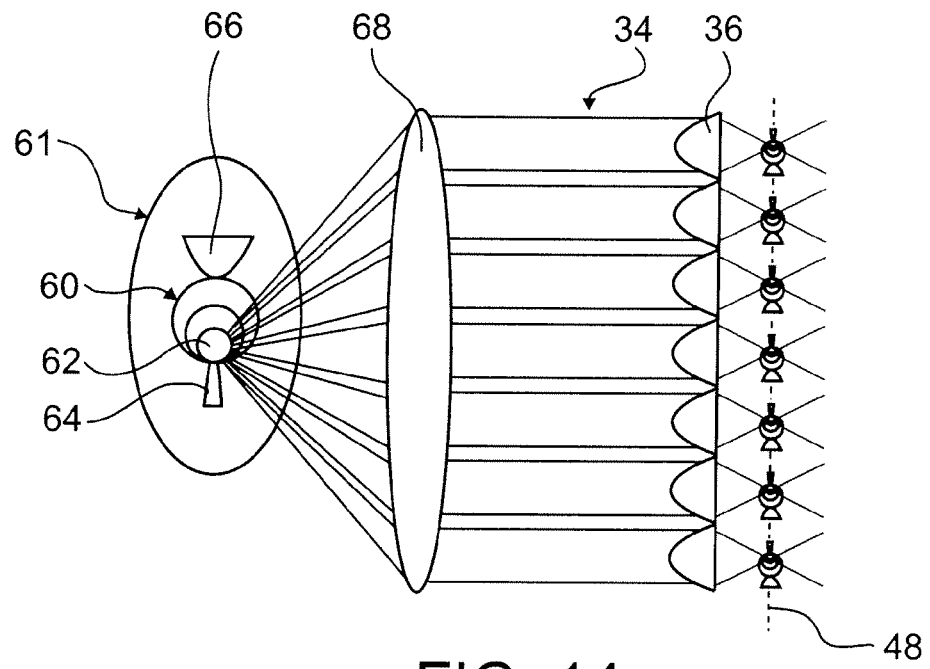
FIG. 14 is a schematic view of an incoherent illumination system for a microscope device according to the invention.

With regard to the achievable luminous flux on the specimen 12 the use of coherent light, i.e. laser light, as the illumination light 16 in general is most favorable, since here almost the entire illumination light 16 impinging on the microoptics also can reach the associated openings 32 and 132, respectively, of the opening pattern 24 and 134, respectively. However, it is also possible to create quasi-coherent conditions and approximately the same luminous flux as with laser light sources by using an appropriate optical set-up, even when using incoherent light sources such as arc lamps. An example for such incoherent illumination is shown in FIG. 14. In this case one takes advantage of the fact that in the spot 60 of arc lamps 61, the luminous area of which typically has a diameter of about 0.6 to 2 mm, there is no homogeneous intensity distribution, but rather there is a much brighter "hot spot" 62 very close to one of the electrodes 64, 66, with the intensity decreasing in all directions with increasing distance to this hot spot 62. A collector optics 68 is provided for collimating light from the hot spot 62, i.e. from the area having the maximal luminous flux, onto the microlens arrangement 36. For each of the microlenses 36 an image of the spot 60 is formed in the focal plane 48 of the microlenses 36. In general, such an arrangement may be used for all of the embodiments shown in FIGS. 4 to 10, wherein instead of the simple collector optics 68 also a multi-stage optics may be used.

When using microlenses for generating a spot pattern by means of non-coherent arc lamps, the images of the luminous area 60 in the focal plane 48 are imaged by means of the subsequent optical arrangement 46, which comprises the two projective lenses 42 and, if necessary, further optical elements, in such a manner onto the opening pattern 24 that exclusively the area 62 having maximal luminous flux is imaged into the corresponding opening 32. Thereby the opening 32 acts as an aperture in order to block light from the surroundings of the area 62 having maximal luminous flux, i.e. light from the darker regions of the luminous area 60. According to the simple design shown in FIG. 12A, the entire luminous area 60 of the arc lamp 61 is imaged onto the opening pattern 24 of the mask 22, wherein only the respective image of the area 62 having maximal luminous flux falls within the respective openings 32. Hence, only the mask 22 provides for the spatial filtering of the entire illumination light 16 originating from the luminous area 60. Under certain circumstances this may result in a large amount of illumination light which is not used being coupled into the optical arrangement, which light may tamper the measurement at the detector 28 as stray light or as disturbing light which creates non-desired fluorescence.

This can be avoided by providing a spatial filter already before the microlens arrangement 34, so that only the illumination light originating from the area 62 of maximal luminous flux is utilized for the collimated illumination beam impinging on the microlens arrangement 34, i.e. the collector optics 68 is designed in such a manner that it blocks light from the surroundings of the region 62 of maximal luminous flux in the light collimated onto the microlens arrangement. This can be achieved, for example, in that the collector optics 68 generates an intermediate image of the luminous area 60, with an aperture being provided in the intermediate image plane for blocking light from the surroundings of the area 62 of maximal luminous flux. Preferably, a light guide is used as an aperture, which at the same time also serves to separate the (hot) location of the generation of light from the Nipkow system.

Figure 12B:
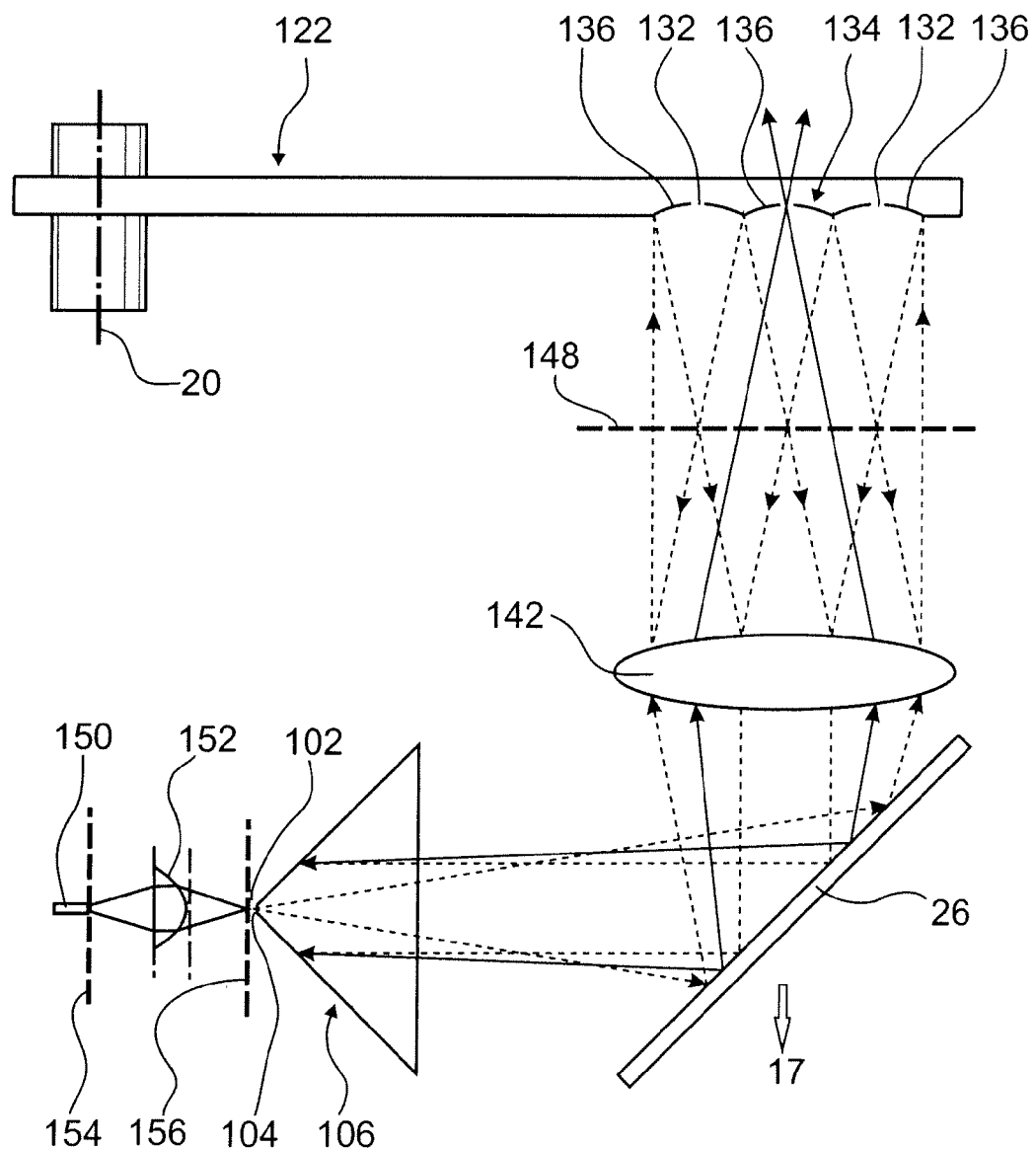
FIG. 12B is a side view of a modified variant of the embodiment of shown in FIG. 12A

The concept of selectively using only light originating from the hotspot for creating an illumination-spotpattern can not only be employed in cases where spotpatterns are created by microlenses, but also in the case of using micromirrors. There one has to enter the instrument through its narrow entrance hole in the entrance plane 102. This is achieved either by bringing the exit faceplate of the coupling fiber into the entrance plane 102, or, as shown in FIG. 12B, by collimating the light from the fiber 150 with a lens 152 of short focal length f (i.e. placing the fiber 150 into the front focal plane 154 of said lens 152) and positioning fiber 150 and lens 152 in such a way that the back-focal plane 156 of said lens lies on the entrance plane 102. The latter approach has the advantage that the microoptical elements are illuminated with higher spatial homogeneity, given that they are illuminated by a (magnified) image of the exit faceplate of the fiber (critical illumination), and in this plane the light is scrambled and hence spatially homogeneous. To increase coupling efficiency one can use a light-guide whose cross section is square or rectangular. Imaging the cross-section of the exit faceplate onto the micro-lenses allows confining the illuminated area to the area seen by the camera and achieving maximal brightness there.

The critical illumination concept of imaging the exit faceplate of a light-guide in order to provide a homogeneously illuminated confined area on a micro-lens- or micro-mirror pattern can also be employed when using coherent (laser-) light. However, to earn the benefits of an increased homogeneity one needs to take established measures to break the beam coherence and thus avoid speckles. A further advantage of this approach is that one can use a fiber or light-guide of greater diameter respective dimensions than the usually employed single mode fibers. This increases coupling efficiency considerably and facilitates alignment.

Figure 15A:
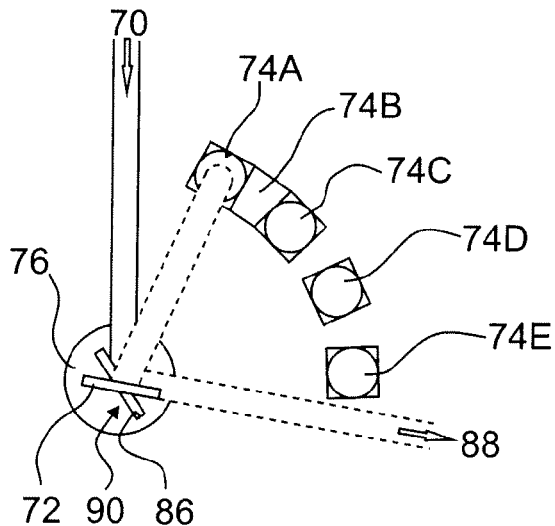
FIGS. 15A and 15B are two different schematic views of a filter arrangement for an incoherent illumination system for a microscope device according to the invention.

Arc lamps, unlike lasers, cannot be turned-on and off quickly, i.e. the intensity cannot be modulated quickly. For this reason one may combine, for example, a quasi-coherent illumination generated by the arrangement of FIG. 14 with a filter selection arrangement as it shown in FIGS. 15A and 15B, respectively. According to this system the incident quasi-coherent light beam 70 is deflected by means of a plane mirror 72 towards a filter element 74A, 74B, 74C, 74D or 74E. The mirror 72 is mounted on a rotary motor 74, for example, a galvanometer, and it is rotatable around an axis 78 by operation of the motor 76 in order to select one of the filter elements 74A to 74E.

Figure 15B:
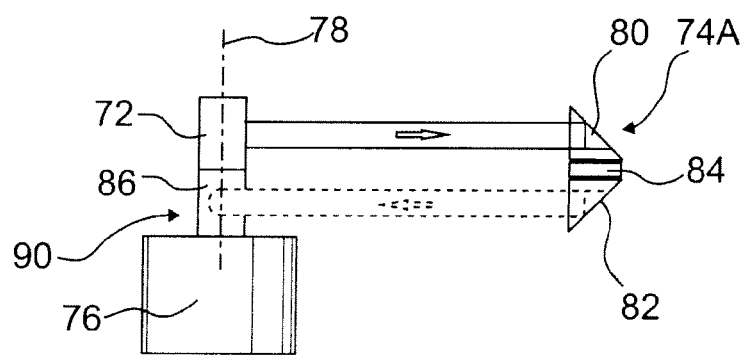

The filter elements 74A and 74C to 74E are designed in such a manner that the beam coming from the mirror 72 is deflected in such a manner that the returning beam is parallel to the incident beam, but it is axially displaced with regard to the incident beam in the direction of the rotation axis 78. As shown in FIG. 15B, this may be achieved, for example, by providing the respective filter element 74A, 74C, 74D, 74E with two reflecting surfaces 80, 82 which are oriented at 90 degrees relative to each other and between which the actual filters 84 are located. The returning beam impinges on a plane mirror 86 which is axially displaced with regard to the mirror 72 and which may be arranged at an angle of, for example, 45 degrees relative to the mirror 72 around the axis 78 and which is rotated synchronously with the mirror 72 by the motor 76. Thereby the two mirrors 72, 86 form, together with the motor 76, a filter selection element 90, by means of which one can choose between different filter elements 74A to 74E without changing the direction of the incident beam 70 and the emergent beam 88 due to operation of the filter selection element 90.

The filters 84, for example, could be designed as different spectral band passes in order to allow for a quick change between different illumination wavelengths and excitation wavelengths, respectively. If the filters 84 are not positioned immediately adjacent to each other, but rather are separated from each other by a non-transparent land 74B, the width of which corresponds at least to that of a filter element, very quickly also different brightness values can be achieved by directing the beam in part onto the transparent filter and in part also onto the non-transparent land. Complete darkening requires that the beam is directed completely onto the non-transparent land. Typically such an arrangement allows to achieve switching times between wavelengths and/or brightness values of less than 1 msec.

It is a condition for the use of such an arrangement for incoherent light that in the incident beam 70 the regions of the luminous area 60 outside the hot spot 62 are blocked, so that the beam is essentially parallel and one can utilize plane mirrors and prisms, respectively.

Figure 11A:
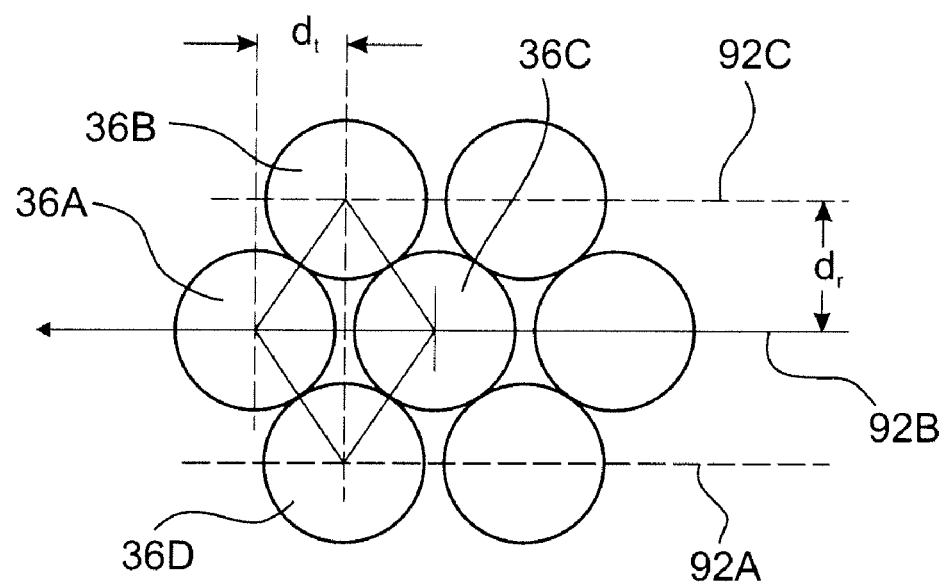
FIGS. 11A and 11B are schematic representations of the arrangement of the microlenses of a radially outer region and a radially inner region, respectively
Figure 11B:
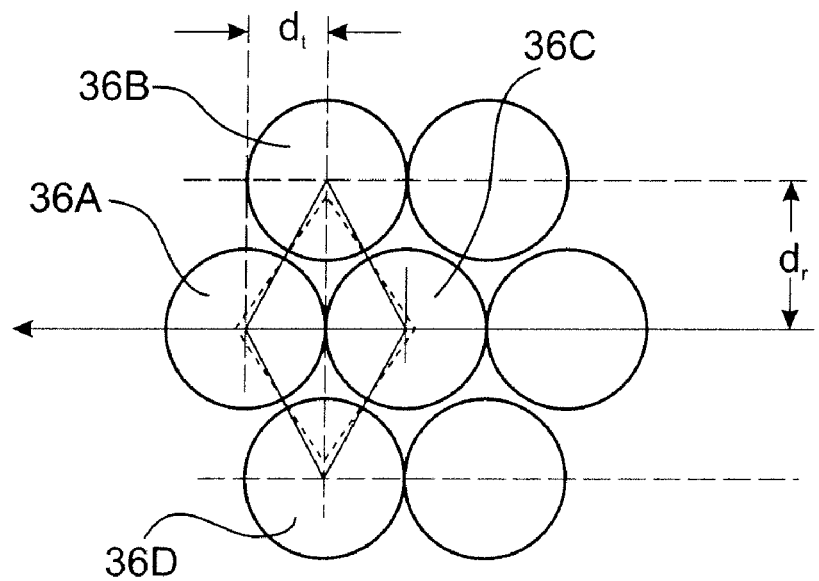
Figure 11C:
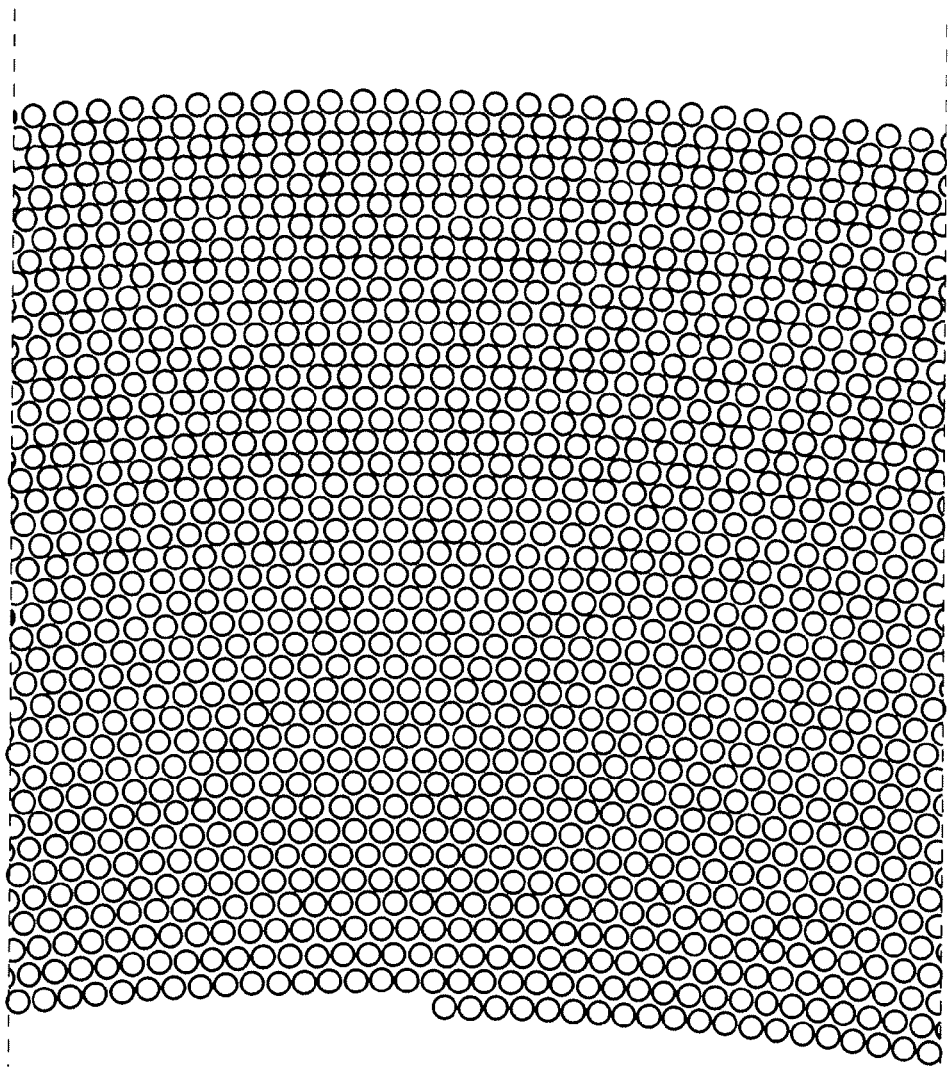
FIG. 11C shows an overview of the microlenses arrangement of FIGS. 11A and 11B.

A specific arrangement of the microlenses 36 is shown in FIGS. 11A to 11C, which, together with a corresponding design of the opening pattern 24, allows for a high packing density and homogeneous illumination of all specimen points. FIG. 11A shows the microlenses 36 in a region which is located radially further outside, whereas FIG. 11B shows microlenses 36 in a region which is located readily further inwardly. An overview over the total pattern is shown in FIG. 11C. The microlenses 36 form a hexagonal arrangement, with the unit cell being formed by four immediately adjacent microlenses 36A, 36B, 36C and 36D, respectively.

According to FIG. 11B the microlenses are arranged in the region of small radii in tangential direction in a maximal dense packing, so that they touch each other in the tangential direction, in order to minimize the tangential distance $d_t$. In this region, however, there is no maximal dense packing in the radial direction.

According to FIG. 11A, however, in the region of larger radii the tangential distance $d_t$ is enlarged so that gaps occur between adjacent microlenses 36A, 36C in the tangential direction. However, here the radial distance $d_r$ between adjacent microlenses 36A, 36B is smaller than in FIG. 11B. Depending on the radius at which the respective unit cell is arranged, the tangential distance $d_t$ and the radial distance $d_r$ of the microlenses 36 are selected in such a manner that the area of the unit cell remains constant, so that homogeneous illumination of all points in ensured. Due to this "distortion" the unit cell, when compared to an ideal hexagonal arrangement, is tangentially elongated in the radial outer region (FIG. 11A) and is radially elongated in the radial inner region (FIG. 11B). In FIG. 11B the unit cell of FIG. 11A is shown in dotted lines for the sake of comparison. For example, the microlenses in the radial outer region, without the corresponding reduction of the radial distance due to the enlarged tangential distance, would see less light than the microlenses located further inwardly in the radial direction.

It is to be understood that in general the microlenses are arranged in the form of spiral shells around a central rotary axis of the microlens arrangement 36, which shells run into each other. Microlenses, which are immediately adjacent to each other in the tangential direction, rest on the same shell. In FIG. 11A the shells are designated by 92A, 92B and 92C, respectively.

It is to be understood that the openings 32 of the mask 22 have to comply with the same arrangement scheme which has been described above. This arrangement scheme, of course, can be utilized also for micromirrors 136 provided with openings 132, as shown, for example, in FIGS. 12 and 13.

It is further to be understood, that for all embodiments of the invention the "openings" 32 and 132 of the pinhole mask 22 and 122, respectively, have to be understood as openings in the sense that they transmit the illumination light and the emission light, respectively. Physically, the openings may be holes in the mask 22, 122 or regions made of transparent material.

While various embodiments in accordance with the present invention have been shown and described, it is understood that the invention is not limited thereto and is susceptible to numerous to numerous changes and modifications as known to those skilled in the art. Therefore, this invention is not limited to the details and described therein, and includes all such changes and modifications as encompassed by the scope of the appended claims.

What is claimed is:

1. A device for confocal observation of a specimen, comprising an objective, a mask, which is located in an illumination beam path and an image beam path and which is rotatable around a central axis, the mask being imaged onto the specimen by means of the objective and being provided with openings for generating an illumination pattern moving on the sample, an arrangement of a plurality of focussing microoptics which is adjusted to the geometric arrangement of the openings of the mask and to the rotation of the mask in order to concentrate the illumination light by each of the microoptics into a respective one of the openings of the mask, and a beam splitter for separating light from the sample which has been collected by the objective and which has passed through the openings of the mask from illumination light, wherein the beam splitter is arranged in the beam path between the mask and the arrangement of the microoptics, wherein the openings of the mask and the microoptics arrangement are arranged fixed to each other and concentric around the central axis, with the openings of the mask and the microoptics arrangement being radially displaced with regard to each other.

2. The device of claim 1, wherein the beam splitter is located in the beam path between the mask and the microoptics arrangement for separating light from the specimen which is collected by the objective and which has penetrated the from the specimen of the mask from illumination light.

3. The device of claim 2, wherein the microoptics is formed by microlenses.

4. The device of claim 3, wherein the scale ratio of the optical arrangement corresponds to the ratio of the distance of one of the microlenses from the central axis to the distance of the associated openings of the mask from the central axis.

5. The device of claim 3, wherein that portion of the focal plane of the microlenses which is imaged by the optical arrangement onto said portion of the openings of the mask and said portion of the openings of the mask are axially displaced relative to each other in the peripheral direction.

6. The device of claim 5, wherein said portion of the focal plane of the microlenses imaged onto said portion of the openings of the mask and said portion of the openings of the mask are arranged diametrically with regard to the central axis.

7. The device of claim 3, wherein the mask and the microlens arrangement are arranged on a common single disc.

8. The device of claim 3, wherein the openings of the mask are arranged radially inwardly and wherein the microlens arrangement is arranged radially outwardly.

9. The device of claim 3, wherein the illumination beam path comprises an odd number of reflections between the microlenses and the openings of the mask.

10. The device of claim 9, wherein a penta prism is arranged in the illumination beam path between the microlenses and the openings of the mask.

11. The device of claim 10, wherein the beam splitter is designed as a long pass so as to deflect the illumination light.

* * * * *